July 12, 1949.　　　　W. F. FAGEN　　　　2,475,883
ELECTRICAL FENCE CHARGING APPARATUS
Filed July 29, 1944　　　　　　　　　　　　　2 Sheets-Sheet 1
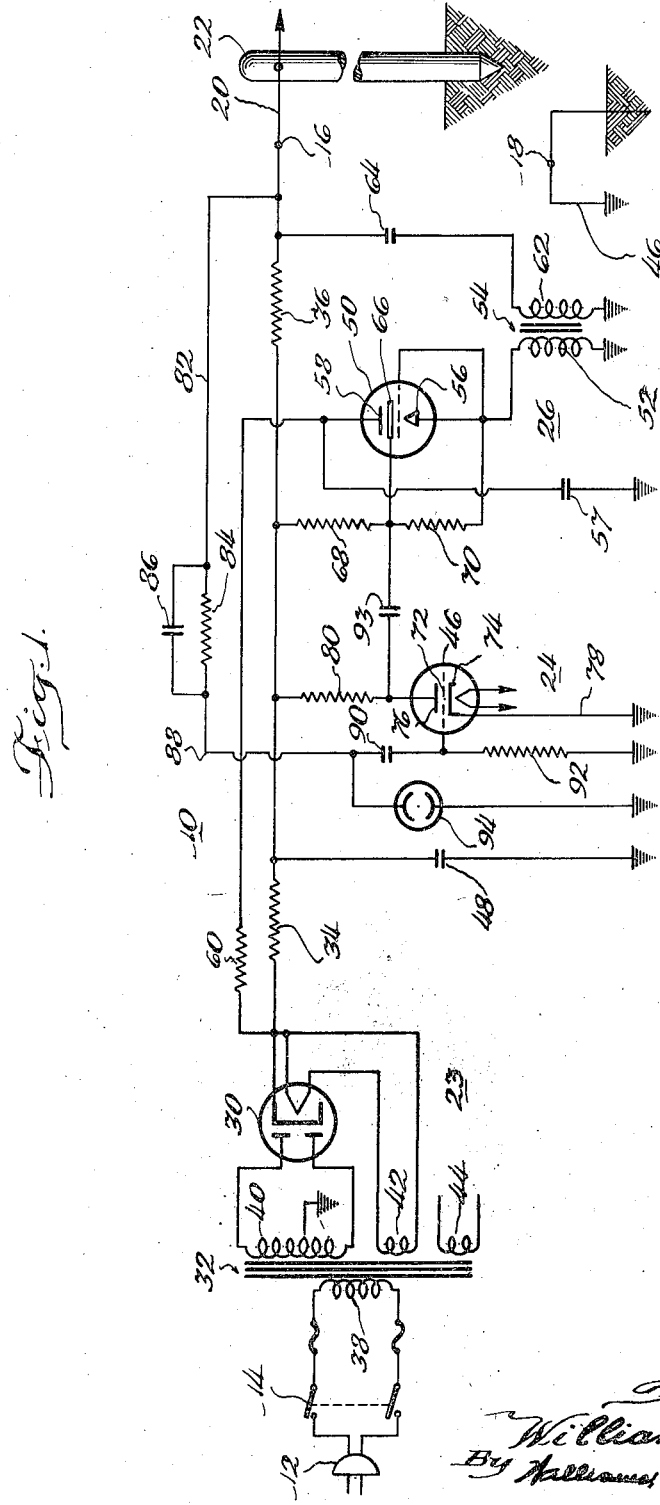

July 12, 1949.　　　W. F. FAGEN　　　2,475,883
ELECTRICAL FENCE CHARGING APPARATUS
Filed July 29, 1944　　　　　　　　　　2 Sheets-Sheet 2
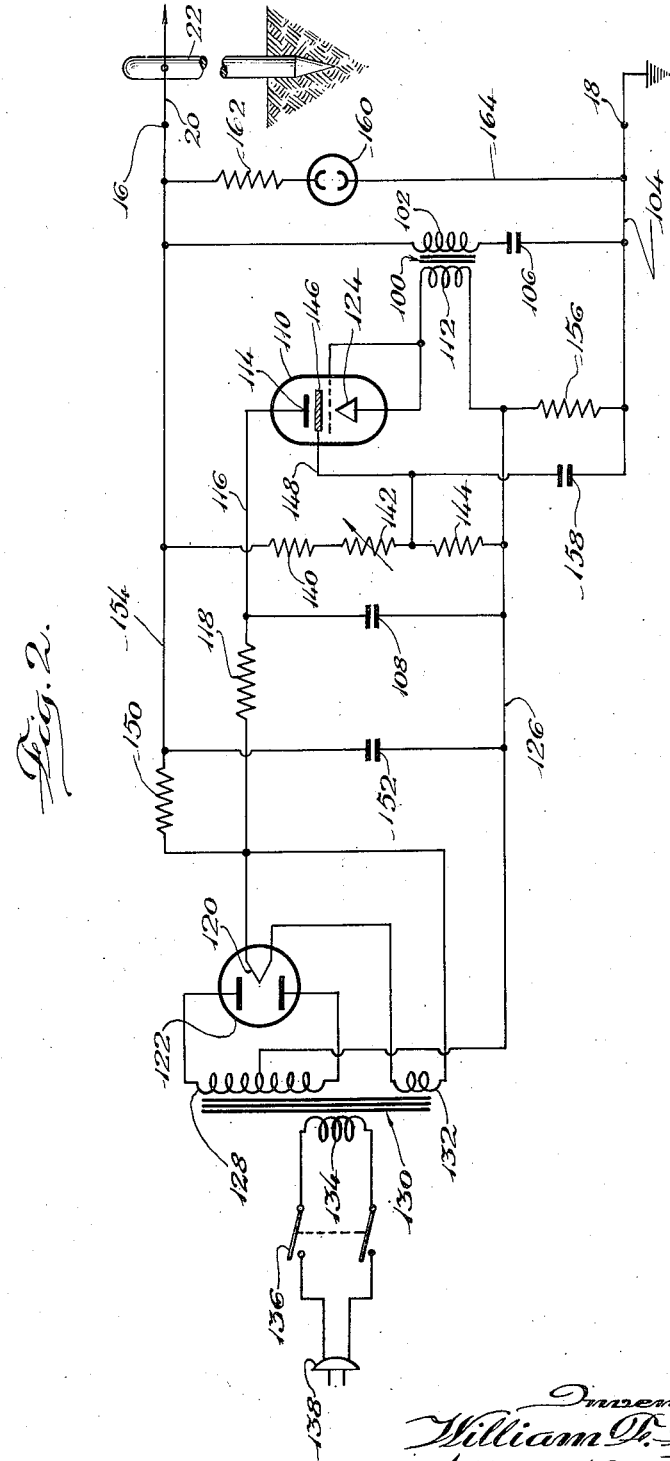

Patented July 12, 1949

2,475,883

UNITED STATES PATENT OFFICE 2,475,883

ELECTRICAL FENCE CHARGING APPARATUS

William F. Fagen, Chicago, Ill., assignor to Stewart-Warner Corporation, Chicago, Ill., a corporation of Virginia Application July 29, 1944, Serial No. 547,213

5 Claims. (Cl. 256—10)

The present invention relates to electrical fence charging apparatus, and has for its primary object the provision of a new and improved apparatus of this character.

Another object of the invention is the provision of a new and improved electrical fence charging apparatus which is highly effective under diverse atmospheric and other conditions, and which is also capable of producing a highly effective shocking impulse.

A further object of the invention is to provide an electrical fence charging apparatus providing a high leakage resistance across the fence circuit under normal conditions, and providing a highly effective shocking impulse to the fence and an animal in contact therewith when the fence is contacted by an animal.

Another further object is the provision of a new and improved electrical fence charging apparatus including shocking impulse producing means having a gas tube controlled in response to a change in electrical characteristic occurring upon contact between the fence and an animal, and including also means for preventing operation of said impulse producing means in response to a change in the characteristic occurring when an animal disengages itself from the fence.

Another object of the present invention is to provide a new and improved electrical fence charging apparatus including means for indicating the operation of the apparatus and means for protecting said indicating means, and which apparatus is responsive and highly sensitive to changes occurring at a relatively fast rate, i. e., the apparatus is insensitive to changes occurring at a slow rate, as might be occasioned by changes in atmospheric conditions.

Other objects and advantages of the present invention will become apparent from the ensuing description, in the course of which reference is had to the accompanying drawings, in which:

Fig. 1 is a diagrammatic representation of an electrical fence charging apparatus constructed in accordance with the present invention; and Fig. 2 is a similar view of another embodiment of the invention.

Referring first to Fig. 1, the apparatus illustrated in this figure is of a type wherein the shocking impulse supplying means is normally inoperative and is rendered operative and effective to supply a shocking impulse to the fence when an animal contacts the fence. A relatively low control voltage is applied to the fence circuit through a control resistor, and when an animal contacts the fence a momentary change in current flow through the resistor occurs to provide what may be termed a control impulse. It is this change or control impulse that is utilized to render operative the impulse producing means to apply an energy for shocking impulse to the fence. It is preferred that the fence normally be maintained at a positive potential to the earth for, as pointed out in my copending application, Serial No. 510,307, filed November 15, 1943, now United States Patent No. 2,414,943, and assigned to the assignee of the present application, this produces a higher leakage resistance across the fence circuit and improves considerably the operation of the apparatus under diverse conditions. The instant application is a continuation-in-part of my foregoing copending application.

The apparatus of the present invention not only has the foregoing advantages, but it also provides a greater shocking effect upon an animal contacting the fence. This is accomplished by arranging the impulse supplying means so that the fence wire is charged negatively when the animal contacts the fence, the negative charge providing a more effective shock than a charge of the opposite polarity. Thus, the fence wire is normally maintained at a positive potential and is supplied with a negative charge upon contact therewith by an animal, whereby the apparatus is made more effective under various conditions and produces a highly effective shocking impulse.

Referring now to Fig. 1, the embodiment of the invention illustrated in Fig. 1 includes an electrical fence charging apparatus 10, constructed in accordance with the present invention. The apparatus may be connected to a suitable source of power, such, for instance, as a 110 volt alternating current source through a plug type connector 12, and an on-off switch 14 operable to control the supply of power to the apparatus. The apparatus includes output terminals 16 and 18 which are adapted to be connected to a fence circuit including a bare conductive fence wire 20 and earth, respectively.

The fence wire may be supported upon a number of fence posts 22 (of which only one has been illustrated), placed in the earth in conventional manner. It should be understood that in some installations it is preferable to use two fence wires, one corresponding to the single wire 20 illustrated, and the other to the earth or ground connection. In the event two wires are utilized, then the terminal 18 is connected to the second wire rather than to earth, as indicated. It should be understood also that the term "fence" is not limited to fences for pastures or other enclosures for cows or horses or the like, but is intended to be broad enough to include protective safeguards for houses, rooms and the like, to prevent, or tend to prevent, human beings from entering or leaving the premises.

The electrical fence charger illustrated includes normally inoperative energy impulse producing means which is controlled in response to contact between the fence wire and the animal to produce a shocking or energy impulse through the wire and the animal coming into contact with it. The apparatus includes in the main, a source of power, control and amplifying means, and impulse producing means—these being indicated generally by reference characters 23, 24 and 26, respectively. The apparatus is so constructed and arranged that a control impulse or voltage is produced when an animal contacts the fence. This control voltage is amplified by the amplifier 24 and produces a current impulse in the impulse producing means, which in turn generates a voltage. The voltage thus generated is applied to the fence, the fence being charged negatively to produce a more effective shock to deter animals and the like from leaving the enclosure. The impulse producing means is so constructed and arranged that no impulse is applied to the fence when an animal disengages itself from the fence.

The power source 23 may take various forms and it is illustrated as being of the electronic type including a rectifier tube 30 (preferably of the 6X5GT type) energized through a transformer 32. The rectifier supplies a relatively low direct current voltage, preferably of about 300 volts, to the fence wire through the filter and control resistors 34 and 36, respectively (of values of about 25,000 and 100,000 ohms, respectively). It may be noted that the rectifier is so connected to the fence that the fence is maintained at a positive polarity, thereby to provide an increased leakage resistance across the fence, as set forth in my previously referred to copending application Serial No. 510,307.

The transformer 32 includes a primary winding 38 and three secondary windings 40, 42 and 44. Winding 40 is connected to the anodes of the rectifier tube and its center turn is grounded, as to the chassis, which chassis is connected to earth through conductor 46 and output terminal 18. Winding 42 is connected to the filament heater of the rectifier tube which is connected, in turn, in conventional manner to the cathode of the tube and resistor 34. Winding 44 is connected to the cathode heater of tube 46 forming part of the amplifier, and to which further reference will be had shortly. The power supply includes also a filter condenser 48 (of a value of about 1.5 microfarads) connected between ground and the fence end of the resistor 34.

The shocking or energy impulse supplying means includes a normally charged condenser adapted to be discharged through the primary winding of a transformer connected to the fence through a relay, whenever the relay is operated, and, in order to produce a highly effectual shock, the secondary winding of the transformer is so connected to the fence that the fence is charged negatively. In the instant embodiment of the invention, the relay is of a quick acting type and preferably is a gas tube 50 of the 631P1 type. The primary winding 52 of a transformer 54 is connected across ground and the cathode 56 of the tube and the current impulse providing condenser 57 is connected across ground and the anode 58 of the tube. The anode 58 is connected to the positive terminal of a power source, i. e., the rectifier 30, through a resistor 60 (having a value of about ½ megohm). The condenser 57 is normally charged through resistor 60 and whenever the tube 59 is rendered conductive, the condenser discharges through the tube and the primary winding 52 of transformer 54. As a result, a relatively high voltage is induced in the secondary winding 62 of the transformer and applied to the fence through the blocking condenser 64 (of a value of about .03 microfarad) in such manner that the fence is charged negatively.

In order to render the apparatus sensitive and also render it effective to produce a shocking impulse only upon contact between the fence and an animal and not upon release of the animal from the fence, the grid 66 of the gas tube is provided with what may be termed a normal positive biasing voltage so that it will not be rendered conductive upon release of the animal when a negative control potential is applied to the grid. The biasing voltage is obtained from the control voltage source and is applied to the grid through a resistor 68 (having a value of about 2 megohms) connected across the grid and the junction of resistors 34 and 36 and to the cathode 56 through a resistor 70 (having a value of about 1 megohm). The resistor 70 and cathode are connected to ground through the primary winding 52 of the transformer. It may be noted, therefore, that the grid is maintained at a positive potential above ground and the cathode potential so that its potential need not be raised as much in order to fire or render the tube 50 conductive. The gas tube 50 is of a type which may be rendered conductive or fired upon the application of either a positive or negative voltage to the grid. A positive bias is applied to the grid and control of the tube is so arranged that the grid is rendered more positive upon contact between the fence and an animal, and more negative upon disengagement. Thus, in order to fire the tube only a small increase in positive potential is required but a large increase in negative potential is required. The increase in negative potential required is such that the tube will not fire upon disengagement of an animal from the fence.

The conductivity or firing of tube 50 is controlled in response to a control voltage resulting from contact between the fence and an animal. The control voltage is obtained from the fence circuit and applied to the grid 72 of the amplifier tube 46, which also includes a cathode 74 and an anode 76. The cathode is connected to ground through conductor 78 and the anode to a source of positive voltage through resistor 80 (having a value of about 100,000 ohms).

The control voltage results from a change in current flow through the control resistor 36 when an animal contacts the fence. When this happens the fence end of this resistor becomes more negative. The fence end of the resistor is connected to the grid 72 of amplifier tube 46 through a circuit including a conductor 82, the parallel connected resistor 84 and condenser 86 (having values of about 1 megohm and .002 microfarad, respectively), conductor 88 and condenser 90 (having a value of about .02 microfarad). The grid 72 is also connected to ground through a grid leak resistor 92 (having a value of about 1 megohm).

In order to prevent the apparatus from producing a shocking impulse in response to changes in current flow through the fence circuit occasioned by changes in atmospheric conditions or other slow changes, the condensers 90 and 86 are chosen to present a high impedance to slow changes but a relatively low impedance to changes of the order of those occurring when the fence is contacted by an animal. As a result, the apparatus produces a shocking impulse when the fence is contacted by the animal.

The amplifier is coupled to the gas tube through a coupling circuit including a condenser 93 connecting the anode of tube 46 to the grid 66 of tube 50.

An indicator and protector lamp 94 is connected across conductor 88 and ground. It may be of the cold cathode gas discharge type and arranged normally to be nonconductive but to become conductive at a voltage of about 90 volts, whereby it limits the voltage applied to the grid of the amplifier tube. The lamp 94 breaks down or becomes conductive each time an impulse is applied to the fence and also when and if lightning should strike the fence. Thus, the lamp protects the amplifier and impulse producing means and also the condenser 90.

The arrangement of the two condensers 86 and 90, of which the former shunts resistor 84, effectively connects the grid of the amplifier 46 to the fence circuit in so far as rapid changes, such as those occurring upon contact between an animal and the fence, are concerned. Thus, the resistor 84 which serves to protect the lamp 94 does not decrease the sensitivity of the apparatus to rapid changes.

In order to place the apparatus in operation, the fence circuits should be connected to the output terminals 16 and 18 and the power switch 14 should be closed.

Under normal conditions a relatively low direct current voltage is applied to the fence by the power supply means 23, the fence being connected to the rectifier output through the resistor 36 so that it is maintained at a low positive potential. The maintenance of the fence at a positive voltage in the neighborhood of 300 volts, increases the leakage resistance across the fence, thereby making the apparatus more effective and economical under diverse atmospheric conditions. In addition, the condenser 57 is charged in readiness to be discharged through the gas tube 50 and the primary winding 52 of transformer 54.

When an animal contacts the fence, the current flow through the fence circuit and control resistor 36 increases, thereby providing a control voltage which is amplified to render the tube 50 conductive so that condenser 57 is discharged through the primary winding of transformer 54 to apply a shocking impulse of negative polarity to the fence. When the flow of current through the resistor 36 increases, the fence end of that resistor is made more negative and this change in voltage is applied to the grid 72 of amplifier tube 46, making the grid more negative and decreasing the flow of current in the anode cathode circuit of the amplifier tube. As a result, the anode is made more positive and this more positive voltage is applied to grid 66 of the gas tube 50 through the coupling condenser 93 to render the tube conductive. The condenser 57, which is normally charged, thus immediately discharges through the tube and the primary winding 52 of transformer 54. A high voltage is induced in the secondary winding 62 and applied to the fence through the blocking condenser 64 in such manner as to charge the fence negatively. The impulse applied to the fence is of short duration and quickly decreases to a safe value at which it remains as long as the animal is in contact with the fence. If the animal leaves the fence, then after a time interval determined by the sizes of condenser 57 and resistor 60, the apparatus is ready to produce another impulse.

The apparatus will also produce a further impulse if a second animal comes into contact with the fence after the first has been in contact with the fence for a time interval long enough to enable the condenser 57 to be recharged. When the second animal contacts the fence, the flow of current through resistor 36 is again increased to render the amplifier effective to fire tube 50 to produce a shocking impulse in the manner heretofore described.

The apparatus does not produce a shocking impulse when an animal disengages itself from the fence. This results from the fact that the grid 66 of the gas tube is biased in a positive direction and is rendered more positive when an animal contacts the fence and more negative when an animal disengages itself from the fence. Upon disengagement, the flow of current through control resistor 36 decreases, with the result that the fence end thereof becomes more positive. This more positive voltage is applied to the grid 72 of the amplifier tube to increase the flow in the plate circuit of that tube. The plate is thus rendered more negative as is the grid 66 of the gas tube. The voltage swing of the grid 66 in a negative direction is not sufficient to overcome the positive bias applied to it and to fire the tube. As a result, no shocking impulse is produced upon disengagement.

The indicator lamp 94 provides an indication of the operation of the charging apparatus and also serves to protect the apparatus against lightning discharges, and the like.

The apparatus is sensitive only to changes in current flow in the fence circuit occurring at a rapid rate because of the interposition of the condensers 86 and 90 in the control circuit and the sensitivity is maintained at a high value even though the protective resistor 84 is utilized, because this resistor is shunted by the condenser 86.

The principles of the present invention may be embodied also in arrangements wherein the tube in the impulse producing circuit is directly controlled in response to the momentary increase in current flow when an animal contacts the fence, i. e., no separate amplifier is utilized. An arrangement of this character is illustrated in Fig. 2, to which reference is now had.

The shocking impulse in this arrangement is also supplied by a condenser discharging through an electron tube of the gas filled type and the primary winding of a transformer having its secondary winding connected to the fence circuit. In Fig. 2 the transformer is indicated by the reference character 100, and its secondary winding 102 is connected across the fence wire 29 and a conductor 104 which is connected in turn to the output terminal 18, which, it may be remembered, is connected to earth. A direct current blocking condenser 106 is connected in series with the winding 102.

The shocking or energy impulse is supplied by a condenser 108 (having a value of about 2 microfarads) dischargeable through tube 110 and the primary winding 112 of transformer 100 whenever an animal contacts the fence. The tube 110 is also preferably of the cold cathode gas type (such as the 631P1 type). The plate 114 of the tube is connected by conductor 116 to the condenser 108 and through resistor 118 (having a value of about ½ megohm) to the filament 120 of a full wave rectifier tube 122. The cathode 124 of the gas tube is connected through the primary winding 112 of transformer 100 to the negative line 126 of the power supply, which in turn is connected to the center tap of the secondary winding 128 of the rectifier plate transformer 130 in conventional manner. Another secondary winding 132 of the transformer is connected to the filament of the rectifier tube. The primary winding 134 of the transformer is adapted to be connected to a suitable source of alternating current through a switch 136 and a plug-in type connector 138.

The gas tube 110 is normally biased positively slightly below its firing point by a resistance network including the series connected resistors 140, 142 and 144, of which resistor 142 is adjustable to provide a sensitivity control. The junction of resistors 142 and 144 is connected to the grid 146 of the gas tube by a conductor 148. The resistors, it may be noted, are connected across the control voltage source and the ground end of the primary winding 112.

Under normal conditions a relatively low direct current voltage of positive polarity is applied to the fence through the resistor 150 having associated therewith a filter condenser 152 connected across conductors 154 and 126, of which conductor 154 is connected to the fence circuit.

The tube 110 is rendered conductive in response to a change in current flow in the fence circuit when an animal contacts the fence. When such contact occurs there is an increase in current flow through a control resistor 156 connected between conductors 104 and 126. When the current flow through the resistor 156 increases, its ground end becomes more positive and this more positive potential is applied to the grid 146 of the gas tube through a coupling condenser 158 interconnecting conductors 104 and 148. The condenser 158 is of a value to prevent operation of the apparatus to produce an impulse in response to slow changes of current, i. e., it performs the function performed by condensers 86 and 90 of the previously described embodiment.

In order to provide a time interval between positive impulses, the condenser 108 and resistor 118 are so proportioned that it takes slightly less than one second for the condenser to be charged to a voltage sufficient to enable the tube to be rendered conductive when an animal contacts the fence.

An indication of the operation of the apparatus is provided by an indicator lamp 160 connected across the output of the apparatus through resistor 162 and conductor 164. Under normal conditions, i. e., when no animal is in contact with the fence, the lamp glows with a certain brilliancy. Upon contact and the occurrence of energy impulse, the lamp glows brightly for a brief interval, i. e., for the duration of the impulse. The indicator lamp also serves to indicate short circuits or partial short circuits as under these conditions it does not glow.

In operation the plug 138 is inserted in a suitable receptacle and switch 136 is closed, thereby to render the rectifier operative. A relatively low direct current is supplied to the fence circuit through the resistor 150, the fence wire 20 being maintained at a positive potential. Likewise condenser 108 is charged through resistor 118 to a relatively low voltage which may, however, be somewhat higher than the voltage normally applied to the fence. The tube 110 is normally nonconductive.

Thus, under normal conditions a low voltage is supplied to the fence and condenser 108 is charged in readiness to be discharged through the tube 110 and the primary winding 112 of transformer 100 whenever an animal contacts the fence. When an animal does contact the fence, the current flowing through resistor 156 increases with the result that the ground end thereof becomes more positive. This more positive potential is applied to the grid 146 through condenser 158 and conductor 148. The tube thereupon is rendered conductive and the condenser 108 immediately discharges through it and the primary winding 112. A higher voltage is induced in the secondary winding and the secondary winding is so connected to the fence that the fence is charged negatively, as in the previously described embodiment. When the condenser is substantially discharged, the tube 110 becomes nonconductive because the flow of current through the resistor 118 is insufficient to maintain the tube conductive. After the initial contact of the fence by an animal, the flow of current through resistor 156 reaches a uniform value, with the result that even though condenser 108 be fully charged, no additional impulse is applied to the fence until some other animal contacts the fence or in the event the first animal frees itself from the fence and thereafter again comes into contact with it.

Upon each occurrence of an impulse, the indicator tube 160 glows more brightly than it does ordinarily, thereby giving an indication of an application of an impulse. The lamp also indicates short circuits or partial short circuits as under these conditions it does not remain lighted.

No impulse is produced when an animal disengages itself from the fence because of the positive bias applied to the grid of the gas tube. This bias, as in the first described embodiment of the invention, is sufficient to prevent the gas tube from being rendered conductive when the grid is swung negatively as is the case when an animal disengages itself from the fence and there is a decrease in flow of current through the control resistor 156.

In order that the apparatus of the two embodiments not operate because of the pick-up of stray voltages of a magnitude which may normally be encountered in practice, the apparatus is constructed and arranged to attenuate conventional power frequencies and to amplify best frequencies in the order of the pulse rate, which may be in the order of those produced by contact with the wire and predominantly in the order of about 4,000 cycles per second (the pulse duration being of the order of 200 microseconds). Thus, in the embodiment of Fig. 1, the amplifier is supplied through condensers and utilizes coupling condensers attenuating 60 cycle current, i. e., the condensers are made smaller so as to pass the desired high frequencies and attenuate the lower frequencies. The condensers 86, 90 and 93 and their associated resistors are designed to provide this attenuation in the embodiment of Fig. 1. In the embodiment of Fig. 2, the condenser 158 is designed to attenuate the low frequencies.

From the foregoing detailed description of the present invention, it may be noted that the principles thereof may be embodied in various forms of apparatus. It is, therefore, contemplated that the invention is not to be limited to the precise constructions disclosed but is to include within its scope all such modifications and variations as come within the scope of the appended claims.

Having thus described my invention, what I claim as new and desire to secure by Letters Patent of the United States, is:

1. Apparatus for energizing a fence comprising a conductive wire adapted to be placed in circuit with the body of an animal contacting the wire, including in combination, normally inoperative energy impulse supplying means adapted to be coupled to the fence wire and including a normally nonconductive grid controlled electron tube of the gas filled type, current responsive means adapted to be coupled to the fence circuit and tube and changing the grid voltage of said tube in a predetermined direction to render said tube conductive upon contact between the wire and the body of an animal and in the opposite direction when an animal disengages itself from the wire, and means including grid biasing means associated with said tube for applying a grid bias of a predetermined polarity to said tube preventing said tube from being rendered conductive upon disengagement of the animal from the wire.

2. Apparatus for energizing a fence comprising a conductive wire adapted to be placed in circuit with the body of an animal contacting the wire, including in combination, normally inoperative energy impulse supplying means adapted to be coupled to the fence wire including a condenser and a transformer having a primary winding through which the condenser is adapted to be discharged and which is adapted to be inductively connected to the fence, means including a source of voltage and resistor adapted to be coupled to the fence wire for applying a control voltage to the fence wire and producing controlled impulses when the flow of current in said wire changes, means including a grid controlled electron tube of the gas filled type in circuit with the primary winding and condenser coupled to said resistor and rendered conductive in response to a change in current flow in one direction occurring upon contact between the wire and the body of an animal for discharging said condenser through said primary winding and tube, and means including grid biasing means associated with said tube for preventing said tube from being rendered conductive upon a change in current flow in the opposite direction occurring upon disengagement of the animal from the wire.

3. Apparatus for energizing a fence comprising a conductive wire adapted to be placed in circuit with the body of an animal contacting the wire, including in combination, normally inoperative energy impulse supplying means including a first power source, a condenser normally charged from said power source, and a transformer having a primary winding through which the condenser is adapted to be discharged and which is adapted to be inductively connected to the fence, means including a second power source adapted to apply a control voltage to the fence circuit, means including a grid controlled electron tube of the gas filled type in circuit with the primary winding and condenser rendered conductive in response to a change in current flow occurring upon contact between the wire and the body of an animal for discharging said condenser through said primary winding and tube, and means including grid biasing means associated with said tube and second power source for preventing said tube from being rendered conductive upon disengagement of the animal from the wire.

4. Apparatus for energizing a fence comprising a conductive wire adapted to be placed in circuit with the body of an animal contacting the wire, including in combination, normally inoperative energy impulse supplying means including a condenser and a transformer having a primary winding through which the condenser is adapted to be discharged and which is adapted to be inductively connected to the fence, means including a voltage source adapted to apply a control voltage to the fence circuit, means including a grid controlled electron tube of the gas filled type in circuit with and located between the primary winding and condenser and rendered conductive in response to a change in current flow occurring upon contact between the wire and the body of an animal for discharging said condenser through said primary winding and tube, and means including resistors connected in series across said voltage source and cathode and connected to the grid for supplying a grid bias preventing said tube from being rendered conductive upon disengagement of the animal from the wire.

5. Apparatus for energizing a fence comprising a conductive wire adapted to be placed in circuit with the body of an animal contacting the wire, including in combination, normally inoperative energy impulse supplying means including a condenser and a transformer having a primary winding through which the condenser is adapted to be discharged and which is adapted to be inductively connected to the fence, means including a voltage source adapted to apply a control voltage to the fence circuit, means including a grid controlled electron tube of the gas filled type in circuit with and located between the primary winding and condenser and rendered conductive in response to a change in current flow occurring upon contact between the wire and the body of an animal for discharging said condenser through said primary winding and tube, and means including resistors connected in series across said voltage source and the terminal of the primary winding remote from the cathode and connected to the grid for supplying a grid bias preventing said tube from being rendered conductive upon disengagement of the animal from the wire.

WILLIAM F. FAGEN.

REFERENCES CITED

The following references are of record in the file of this patent:

UNITED STATES PATENTS

| Number | Name | Date |
|---|---|---|
| 520,510 | Wilson | May 29, 1894 |
| 1,738,299 | Kille | Dec. 3, 1929 |
| 1,985,051 | Minkler | Dec. 18, 1934 |
| 2,139,489 | Cockrell | Dec. 6, 1938 |
| 2,172,050 | Mayberry | Sept. 5, 1939 |
| 2,198,715 | Willis | Apr. 30, 1940 |
| 2,258,669 | Agnew et al. | Oct. 14, 1941 |
| 2,333,224 | Agnew | Nov. 2, 1943 |
| 2,401,815 | Dalziel | June 11, 1946 |
| 2,413,506 | Klumb | Dec. 31, 1946 |